（12） United States Patent
Panteleev et al.

(10) Patent No.: US 10,559,122 B2
(45) Date of Patent: Feb. 11, 2020

(54) SYSTEM AND METHOD FOR COMPUTING REDUCED-RESOLUTION INDIRECT ILLUMINATION USING INTERPOLATED DIRECTIONAL INCOMING RADIANCE

(71) Applicant: Nvidia Corporation, Santa Clara, CA (US)

(72) Inventors: Alexey Panteleev, Moscow (RU); Evgeny Makarov, Moscow (RU); Sergey Bolotov, Moscow (RU); Yury Uralsky, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 812 days.

(21) Appl. No.: 14/166,627

(22) Filed: Jan. 28, 2014

(65) Prior Publication Data

US 2015/0109300 A1    Apr. 23, 2015

Related U.S. Application Data

(60) Provisional application No. 61/892,316, filed on Oct. 17, 2013.

(51) Int. Cl.
*G06T 15/50* (2011.01)
*G06T 15/55* (2011.01)
*G06T 15/80* (2011.01)

(52) U.S. Cl.
CPC ............ *G06T 15/506* (2013.01); *G06T 15/55* (2013.01); *G06T 15/80* (2013.01)

(58) Field of Classification Search
None
See application file for complete search history.

(56) References Cited

U.S. PATENT DOCUMENTS 8,350,855 B2 * 1/2013 Van Horn, III ......... G06T 15/04
345/426

OTHER PUBLICATIONS

Crassin et al., Interactive Indirect Illumination Using Voxel Cone Tracing, Nov. 4, 2011, Pacific Graphics 2011, vol. 30 (2011), No. 7, pp. 1-10.*

* cited by examiner

*Primary Examiner* — Matthew Salvucci

(57) ABSTRACT

A system for, and method of, computing reduced-resolution indirect illumination using interpolated directional incoming radiance and a graphics processing subsystem incorporating the system or the method. In one embodiment, the system includes: (1) a cone tracing shader executable in a graphics processing unit to compute directional incoming radiance cones for sparse pixels and project the directional incoming radiance cones on a basis and (2) an interpolation shader executable in the graphics processing unit to compute outgoing radiance values for untraced pixels based on directional incoming radiance values for neighboring ones of the sparse pixels.

20 Claims, 3 Drawing Sheets

SYSTEM AND METHOD FOR COMPUTING REDUCED-RESOLUTION INDIRECT ILLUMINATION USING INTERPOLATED DIRECTIONAL INCOMING RADIANCE

CROSS-REFERENCE TO RELATED APPLICATION

This application claims the benefit of U.S. Provisional Application Ser. No. 61/892,316, filed by Bolotov, et al., on Oct. 17, 2013, entitled "Using Clipmaps to Represent Volumetric Data for GI and AO Algorithms," commonly assigned with this application and incorporated herein by reference.

TECHNICAL FIELD

This application is directed, in general, to techniques for computing indirect lighting and, more specifically, to a system and method for computing low-resolution indirect illumination using interpolation.

BACKGROUND

Many computer graphic images are created by mathematically modeling the interaction of light with a three-dimensional (3D) scene from a given viewpoint. This process, called "rendering," generates a two-dimensional (2D) image of the scene from the given viewpoint and is analogous to taking a photograph of a real-world scene.

As the demand for computer graphics, and in particular for real-time computer graphics, has increased, computer systems with graphics processing subsystems adapted to accelerate the rendering process have become widespread. In these computer systems, the rendering process is divided between a computer's general purpose central processing unit (CPU) and the graphics processing subsystem, architecturally centered about a graphics processing unit (GPU). Typically, the CPU performs high-level operations, such as determining the position, motion, and collision of objects in a given scene. From these high-level operations, the CPU generates a set of rendering commands and data defining the desired rendered image or images. For example, rendering commands and data can define scene geometry, lighting, shading, texturing, motion, and/or camera parameters for a scene. The graphics processing subsystem creates one or more rendered images from the set of rendering commands and data.

Scene geometry is typically represented by geometric primitives, such as points, lines, polygons (for example, triangles and quadrilaterals), and curved surfaces, defined by one or more 2D or 3D vertices. Each vertex may have additional scalar or vector attributes used to determine qualities such as the color, transparency, lighting, shading, and animation of the vertex and its associated geometric primitives.

Many graphics processing subsystems are highly programmable through an application programming interface (API), enabling complicated lighting and shading algorithms, among other things, to be implemented. To exploit this programmability, applications can include one or more graphics processing subsystem programs, which are executed by the graphics processing subsystem in parallel with a main program executed by the CPU. Although not confined merely to implementing shading and lighting algorithms, these graphics processing subsystem programs are often referred to as "shading programs," "programmable shaders," or simply "shaders."

A variety of shading programs are directed at modeling illumination in a scene. The physical plausibility of rendered illumination often depends on the application, more specifically, whether or not the rendering is done in real-time. Physically plausible illumination at real-time frame rates is often achieved using approximations. For example, ambient occlusion is a popular approximation because of its high speed and simple implementation. Another example is directional occlusion. Many algorithms can only approximate direct illumination, which is light coming directly from a light source.

Certain algorithms compute indirect illumination coming from different directions for every pixel on the screen. Computing indirect illumination for every pixel is expensive. One such algorithm is voxel cone tracing (see, Crassin, et al., "Interactive Indirect Illumination Using Voxel Cone Tracing," Proc. of Pacific Graphics, Vol. 30 (2011), No. 7, incorporated herein by reference). To improve performance, it is possible to use sparse tracing. For example, indirect illumination may be computed for every fourth pixel on the screen (referred to as "traced pixels") by tracing outgoing radiance of nearby geometry stored in volumetric data structures. Indirect illumination for the remaining pixels (referred to as "untraced pixels") may then be interpolated, for example using a bilateral filter that considers pixel depth and normals.

SUMMARY

One aspect provides a system for computing reduced-resolution indirect illumination using interpolated directional incoming radiance. In one embodiment, the system includes: (1) a cone tracing shader executable in a graphics processing unit to compute directional incoming radiance cones for sparse pixels and project the directional incoming radiance cones on a basis and (2) an interpolation shader executable in the graphics processing unit to compute outgoing radiance values for untraced pixels based on directional incoming radiance values for neighboring ones of the sparse pixels.

Another aspect provides a method of computing reduced-resolution indirect illumination using interpolated directional incoming radiance. In one embodiment, the method includes: (1) computing directional incoming radiance for sparse pixels, (2) projecting the directional incoming radiance cones on a basis and (3) computing outgoing radiance values for untraced pixels based on directional incoming radiance values for neighboring ones of the sparse pixels.

Yet another embodiment provides a graphics processing subsystem. In one embodiment, the graphics processing subsystem includes: (1) a memory configured to store a graphics buffer and (2) a graphics processing unit (GPU) coupled to the memory and configured to: (2a) compute directional incoming radiance for sparse pixels, (2b) project the directional incoming radiance cones on a basis and (2c) compute outgoing radiance values for untraced pixels based on directional incoming radiance values for neighboring ones of the sparse pixels.

BRIEF DESCRIPTION

Reference is now made to the following descriptions taken in conjunction with the accompanying drawings, in which.

DETAILED DESCRIPTION

As stated above, pixels for which indirect illumination is not computed outright may be interpolated from neighboring pixels. However, it is realized herein that interpolating based on sparsely computed outgoing radiance fails to account for high-resolution surface detail when untraced pixels have normals that are significantly different from the normals of the traced pixels. It is realized that accurate interpolation needs more information that sparsely computed outgoing radiance alone is able to provide.

It is realized herein that directional incoming radiance is more appropriate to use than outgoing radiance, and that more information should be passed from the tracing step to the interpolation step. It is more specifically realized herein that directional incoming radiance may be computed by projecting incoming light onto a three-dimensional orthogonal basis, or using spherical harmonics. The projected or otherwise synthesized directional values computed by a tracing shader may then be stored in textures and later used by an interpolation shader.

Introduced herein are various embodiments of a system and method in which interpolated directional incoming radiance is used to compute reduced-resolution indirect lighting. Certain embodiments employ a tracing step that uses low-detail surface normals, like geometry normals, to find relevant neighboring pixels. This ensures that for relatively smooth surfaces high-resolution surface detail will be interpolated correctly. In certain embodiments, interpolation is particularly advantageous when the normals of untraced pixels are significantly different from the normals of traced pixels. In one embodiment, normals are significantly different when they differ by at least about 10°. In one embodiment, interpolation is carried out in another, perhaps more conventional manner, with respect to pixels having normals that are not significantly different from those of their neighbors. In certain embodiments, the sparse pixels are regularly spaced apart (e.g., every fourth pixel or every second pixel). In other embodiments, the sparse pixels are irregularly spaced apart (e.g., based on a property associated with a scene such as geometric complexity of the scene in different regions of the screen).

Before describing various embodiments of the graphics processing subsystem and method of representing volumetric data for a scene introduced herein, a computing system within which the graphics processing subsystem or method may be embodied or carried out will be described.

Figure 1:
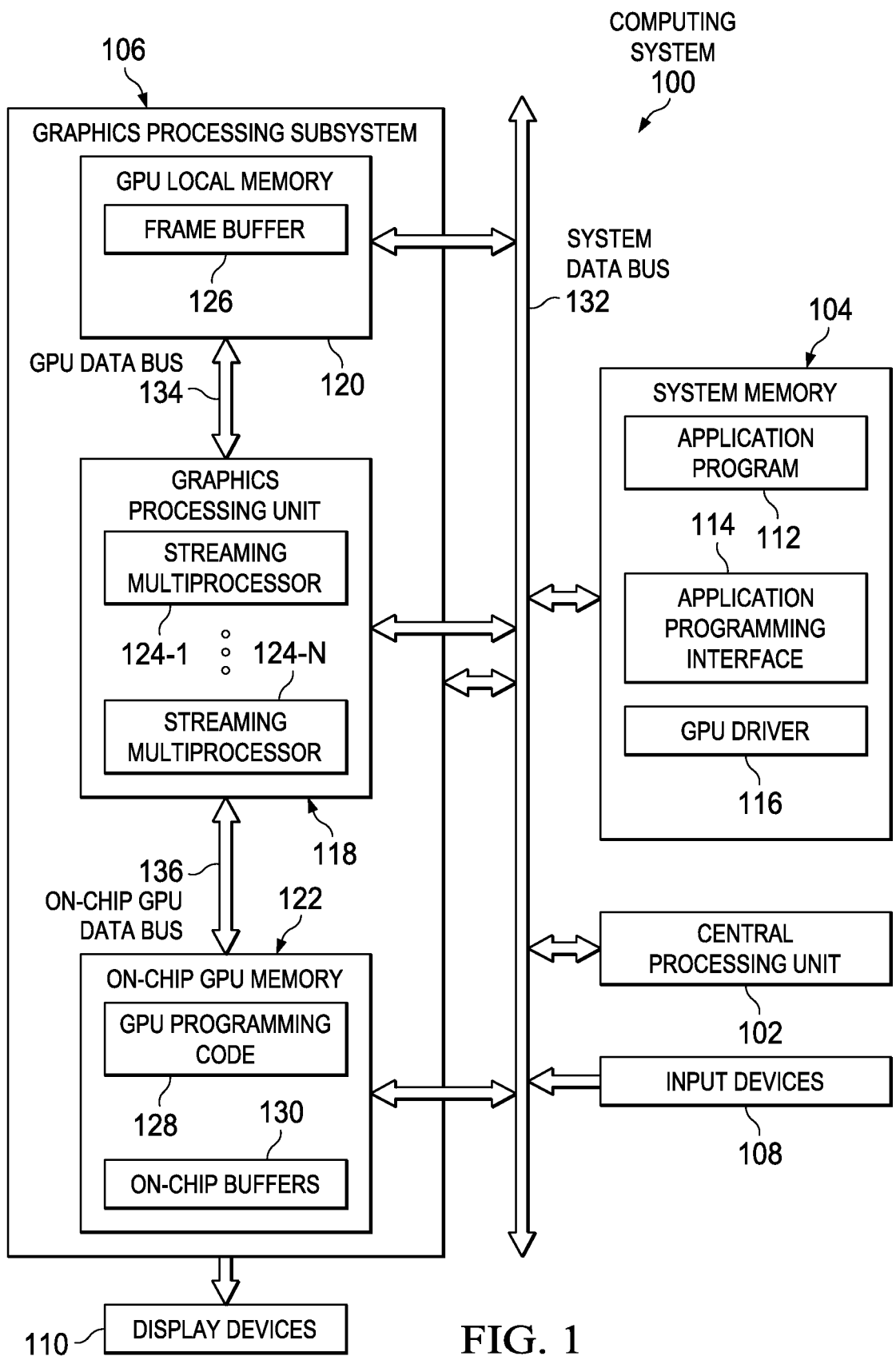
FIG. 1 is a block diagram of one embodiment of a computing system.

FIG. 1 is a block diagram of one embodiment of a computing system 100 in which one or more aspects of the invention may be implemented. The computing system 100 includes a system data bus 132, a central processing unit (CPU) 102, input devices 108, a system memory 104, a graphics processing subsystem 106, and display devices 110. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special-purpose processing unit or coprocessor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, and configures the graphics processing subsystem 106 to perform specific tasks in the graphics pipeline. The system memory 104 typically includes dynamic random-access memory (DRAM) employed to store programming instructions and data for processing by the CPU 102 and the graphics processing subsystem 106. The graphics processing subsystem 106 receives instructions transmitted by the CPU 102 and processes the instructions in order to render and display graphics images on the display devices 110.

As also shown, the system memory 104 includes an application program 112, an application programming interface (API) 114, and a graphics processing unit (GPU) driver 116. The application program 112 generates calls to the API 114 in order to produce a desired set of results, typically in the form of a sequence of graphics images. The application program 112 also transmits zero or more high-level shading programs to the API 114 for processing within the GPU driver 116. The high-level shading programs are typically source code text of high-level programming instructions that are designed to operate on one or more shading engines within the graphics processing subsystem 106. The API 114 functionality is typically implemented within the GPU driver 116. The GPU driver 116 is configured to translate the high-level shading programs into machine code shading programs that are typically optimized for a specific type of shading engine (e.g., vertex, geometry, or fragment).

The graphics processing subsystem 106 includes a graphics processing unit (GPU) 118, an on-chip GPU memory 122, an on-chip GPU data bus 136, a GPU local memory 120, and a GPU data bus 134. The GPU 118 is configured to communicate with the on-chip GPU memory 122 via the on-chip GPU data bus 136 and with the GPU local memory 120 via the GPU data bus 134. The GPU 118 may receive instructions transmitted by the CPU 102, process the instructions in order to render graphics data and images, and store these images in the GPU local memory 120. Subsequently, the GPU 118 may display certain graphics images stored in the GPU local memory 120 on the display devices 110.

The GPU 118 includes one or more streaming multiprocessors 124. Each of the streaming multiprocessors 124 is capable of executing a relatively large number of threads concurrently. Advantageously, each of the streaming multiprocessors 124 can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on. Furthermore, each of the streaming multiprocessors 124 may be configured as a shading engine that includes one or more programmable shaders, each executing a machine code shading program (i.e., a thread) to perform image rendering operations. The GPU 118 may be provided with any amount of on-chip GPU memory 122 and GPU local memory 120, including none, and may employ on-chip GPU memory 122, GPU local memory 120, and system memory 104 in any combination for memory operations.

The on-chip GPU memory 122 is configured to include GPU programming code 128 and on-chip buffers 130. The GPU programming 128 may be transmitted from the GPU driver 116 to the on-chip GPU memory 122 via the system data bus 132. The GPU programming 128 may include a machine code vertex shading program, a machine code geometry shading program, a machine code fragment shading program, or any number of variations of each. The on-chip buffers 130 are typically employed to store shading data that requires fast access in order to reduce the latency of the shading engines in the graphics pipeline. Since the on-chip GPU memory 122 takes up valuable die area, it is relatively expensive.

The GPU local memory 120 typically includes less expensive off-chip dynamic random access memory (DRAM) and is also employed to store data and programming employed by the GPU 118. As shown, the GPU local memory 120 includes a frame buffer 126. The frame buffer 126 stores data for at least one two-dimensional surface that may be employed to drive the display devices 110. Furthermore, the frame buffer 126 may include more than one two-dimensional surface so that the GPU 118 can render to one two-dimensional surface while a second two-dimensional surface is employed to drive the display devices 110.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

Having described a computing system within a novel system and method for computing reduced-resolution indirect illumination using interpolated directional incoming radiance may be embodied or carried out, various embodiments of the novel system and method will be described.

Figure 2:
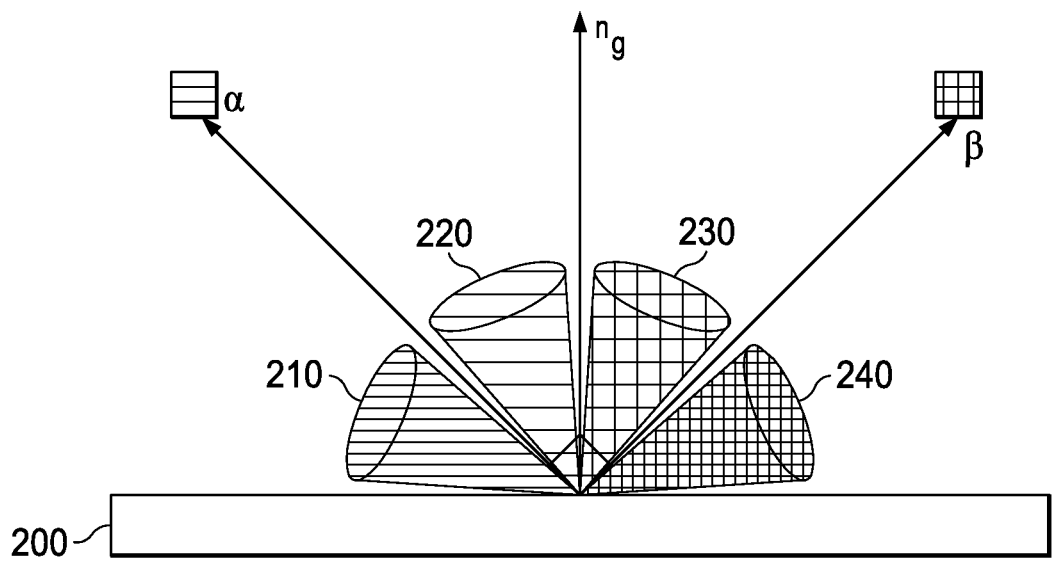
FIG. 2 is a diagram illustrating the projection of traced cones onto a basis in 2D space.

FIG. 2 is a diagram illustrating the projection of traced cones onto a basis in 2D space. A surface 200 has a geometry normal $n_g$. Four directional incoming radiance cones 210, 220, 230, 240 are computed (see, e.g., Crassin, et al., supra) and projected on a basis of orthogonal axes $\beta, \beta$. The angle of the basis relative to the tangent of the surface 200 is arbitrary. In fact, in one embodiment, one of the basis axes is the tangent basis of the surface 200. Depending upon the basis selected, projected colors, or values of incoming radiance, may become negative. This is normal; accordingly, the texture format chosen to store colors should handle negative values correctly.

Thus, instances of a cone tracing shader execute in one or more of the streaming multiprocessors 124-1, . . . , 124-N of the GPU 118 of FIG. 1, computing, for each one of sparse pixels, the directional incoming radiance cones 210, 220, 230, 240 and projecting the directional incoming radiance cones 210, 220, 230, 240 on a basis. The results of this cone tracing are stored in a geometry buffer, or G-buffer, which is part of the on-chip buffers 130 of FIG. 1.

Then, for every pixel of the G-buffer, instances of an interpolation shader iterate through the traced neighbors of each untraced pixel. For every such neighbor, a weight is computed based on depth and normal similarity of the traced and untraced pixels. The projected directional incoming radiance values of all neighbors are then multiplied by corresponding weights and added to form the weighted directional radiance value for the untraced pixel being considered. This directional value is projected onto the normal of the untraced pixel and multiplied by its albedo to get the outgoing radiance value for that pixel. Further considerations assume that all the pixels are white and thus the albedo multiplication step is omitted.

Figure 3:
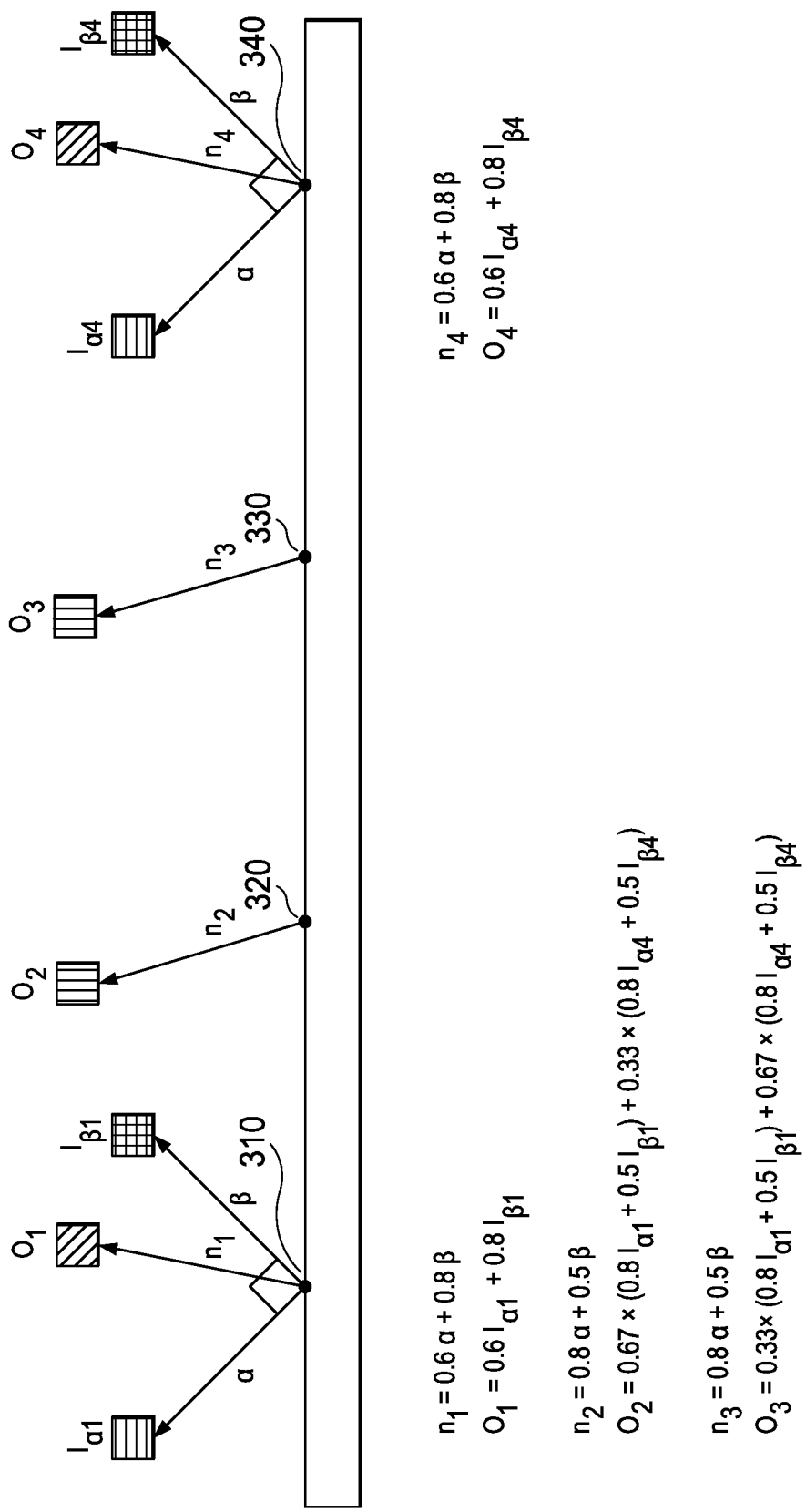
FIG. 3 is a diagram illustrating sparse tracing and interpolation involving pixels having significantly different normals.

FIG. 3 is a diagram illustrating a 2D example of interpolation involving pixels having significantly different normals. For purposes of the example, two pixels 310, 340 are traced and have directional incoming radiance stored as $I_{\alpha 1}$, $I_{\beta 1}$ for the pixel 310, and $I_{\alpha 4}$, $I_{\beta 4}$ for the pixel 340. All the pixels have normals $n_1, n_2, n_3, n_4$ different from the geometry normal, and the normals of the untraced pixels $n_2, n_3$ are significantly different from the normals of the traced pixels $n_1, n_4$. Outgoing radiance values $O_1, O_4$ of the traced pixels 310, 340 can be computed by projecting the directional incoming radiance values $I_{\alpha 1}$-$I_{\beta 4}$ of the same pixels onto their normals $n_1, n_4$. To compute outgoing radiance values $O_2, O_3$ of the untraced pixels 320, 330, interpolation between projections of the incoming radiances of the pixels 310, 340 is performed. For purposes of the example, interpolation weights are computed based only on distance between the traced pixels and interpolated pixels. Because the pixel 320 is closer to the pixel 310 than the pixel 340, the interpolation weight of $I_{\alpha 1}, I_{\beta 1}$ (0.67) is greater than the interpolation weight of $I_{\alpha 4}, I_{\beta 4}$ (0.33). The pixel 330 is closer to the pixel 340 than the pixel 310, so the weights have the opposite relation. In the illustrated embodiment, interpolation and projection are linear operations, so their order can be arbitrary, i.e. interpolation can be performed before projection or vice versa. If directional incoming radiance were not stored in the G-buffer, insufficient information would exist to compute the weights, contributions and, ultimately, outgoing radiance of the interpolated pixels.

Figure 4:
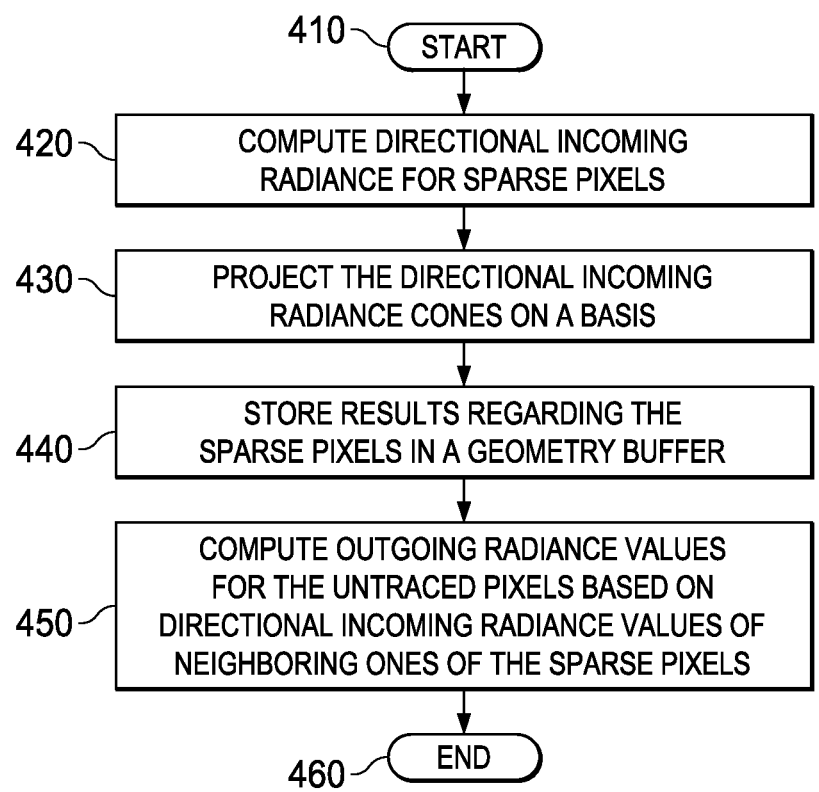
FIG. 4 is a flow diagram of one embodiment of a method of computing reduced-resolution indirect illumination using interpolated directional incoming radiance.

FIG. 4 is a flow diagram of one embodiment of a method of computing reduced-resolution indirect illumination using interpolated directional incoming radiance. The method begins in a start step 410. In a step 420, directional incoming radiance is computed for sparse pixels. In a step 430, the directional incoming radiance cones are projected on a basis. In a step 440, results regarding the sparse pixels are stored in a geometry buffer. In a step 450, outgoing radiance values for the untraced pixels are computed based on directional incoming radiance values of neighboring ones of the sparse pixels. The method ends in an end step 460.

Those skilled in the art to which this application relates will appreciate that other and further additions, deletions, substitutions and modifications may be made to the described embodiments.

What is claimed is:

1. A system for computing reduced-resolution indirect illumination using interpolated directional incoming radiance, comprising:
    a cone tracing shader executable in a graphics processing unit to compute directional incoming radiance cones for sparse pixels and determine directional incoming radiance values of said sparse pixels by projecting said directional incoming radiance cones on a basis; and
    an interpolation shader executable in said graphics processing unit to compute outgoing radiance values for untraced pixels that neighbor said sparse pixels by interpolating said directional incoming radiance values and projecting results of said interpolating onto normals of said untraced pixels.

2. The system as recited in claim 1 wherein said normals of said untraced pixels differ by at least about ten degrees from normals of said sparse pixels.

3. The system as recited in claim 1 wherein said basis has orthogonal axes and is arbitrary.

4. The system as recited in claim 1 wherein said cone tracing shader is operable to store results regarding said sparse pixels in a geometry buffer.

5. The system as recited in claim 1 wherein said interpolating is based on depth and normal similarities between said untraced pixels and said sparse pixels.

6. The system as recited in claim 1 wherein said sparse pixels are regularly spaced apart.

7. The system as recited in claim 1 wherein said sparse pixels are associated with a two-dimensional surface.

8. A method of computing reduced-resolution indirect illumination using interpolated directional incoming radiance, comprising:
   computing directional incoming radiance cones for sparse pixels;
   determining directional incoming radiance values of said sparse pixels by projecting said directional incoming radiance cones on a basis; and
   computing outgoing radiance values for untraced pixels that neighbor said sparse pixels by interpolating said directional incoming radiance values and projecting results of said interpolating onto normals of said untraced pixels.

9. The method as recited in claim 8 wherein said normals of said untraced pixels differ by at least about ten degrees from normals of said sparse pixels.

10. The method as recited in claim 8 wherein said basis has orthogonal axes and is arbitrary.

11. The method as recited in claim 8 further comprising storing results regarding said sparse pixels in a geometry buffer.

12. The method as recited in claim 8 wherein said interpolating is based on depth and normal similarities between said untraced pixels and said sparse pixels.

13. The method as recited in claim 8 wherein said sparse pixels are regularly spaced apart.

14. The method as recited in claim 8 wherein said sparse pixels are associated with a two-dimensional surface.

15. A graphics processing subsystem, comprising:
   a memory configured to store a graphics buffer; and
   a graphics processing unit (GPU) coupled to the memory and configured to:
      compute directional incoming radiance cones for sparse pixels,
      determine directional incoming radiance values of said sparse pixels by projecting said directional incoming radiance cones on a basis, and
      compute outgoing radiance values for untraced pixels that neighbor said sparse pixels by interpolating said directional incoming radiance values and projecting results of said interpolating onto normals of said untraced pixels.

16. The graphics processing subsystem as recited in claim 15 wherein said normals of said untraced pixels differ by at least about ten degrees from normals of said sparse pixels.

17. The graphics processing subsystem as recited in claim 15 wherein said basis has orthogonal axes and is arbitrary.

18. The graphics processing subsystem as recited in claim 15 wherein said interpolating is based on depth and normal similarities between said untraced pixels and said sparse pixels.

19. The graphics processing subsystem as recited in claim 15 wherein said sparse pixels are regularly spaced apart.

20. The graphics processing subsystem as recited in claim 15 wherein said sparse pixels are associated with a two-dimensional surface.

* * * * *